United States Patent [19]

Hainsworth et al.

[11] Patent Number: 4,802,096
[45] Date of Patent: Jan. 31, 1989

[54] CONTROLLED DIRECTION NON-CONTACT DETECTION SYSTEM FOR AUTOMATIC GUIDED VEHICLES

[75] Inventors: Thomas E. Hainsworth; William L. King, Jr., both of Holland, Mich.

[73] Assignee: Bell & Howell Company, Skokie, Ill.

[21] Appl. No.: 49,584

[22] Filed: May 14, 1987

[51] Int. Cl.[4] .............................................. G08G 9/02
[52] U.S. Cl. .................................... 364/461; 318/587; 367/909
[58] Field of Search ............... 364/424, 443, 460, 461; 180/167, 168, 169; 318/580, 587; 367/909; 901/1, 49

[56] References Cited

U.S. PATENT DOCUMENTS

| | | | |
|---|---|---|---|
| 3,039,554 | 6/1962 | Hosking et al. | 180/168 |
| 3,610,363 | 10/1971 | Hartley | 180/168 |
| 3,933,099 | 1/1976 | Sieb | 180/167 X |
| 4,003,445 | 1/1977 | DeBruine | 180/168 |
| 4,151,526 | 4/1979 | Hinachi et al. | 180/168 X |
| 4,328,545 | 5/1982 | Halsall et al. | 180/167 X |
| 4,345,662 | 8/1982 | Deplante | 180/168 |
| 4,379,497 | 4/1983 | Hainsworth et al. | 180/168 |
| 4,500,970 | 2/1985 | Daemmer | 180/168 X |
| 4,528,563 | 7/1985 | Takeuchi | 180/169 X |
| 4,602,334 | 7/1986 | Salesky | 180/168 X |
| 4,623,032 | 11/1986 | Kemmer | 180/169 |
| 4,627,511 | 12/1986 | Yajima | 180/167 |
| 4,700,427 | 10/1987 | Knepper | 318/587 X |

FOREIGN PATENT DOCUMENTS

| | | | |
|---|---|---|---|
| 3121684 | 12/1982 | Fed. Rep. of Germany | 367/909 |
| 53-4933 | 1/1978 | Japan | 180/168 |
| 58-63547 | 4/1983 | Japan | 180/169 |
| 59-16016 | 1/1984 | Japan | 318/587 |
| 2129161 | 5/1984 | United Kingdom | 318/587 |

Primary Examiner—Bentsu Ro
Attorney, Agent, or Firm—Mason, Kolehmainen, Rathburn & Wyss

[57] ABSTRACT

A non-contact collision avoidance system for an automatically guided vehicle is disclosed for preventing collisions between the vehicle and obstacles in the path of the vehicle during vehicle maneuvers, including relatively sharp turns. A sensor device mounted on the vehicle provides panoramic sensing of obstacles in the path of the vehicle. The field of view of the sensor device is altered as a function of the vehicle steering angle. Also disclosed is a steering angle sensor comprising an optical shutter system for providing a signal representing the steering angle of the vehicle.

30 Claims, 2 Drawing Sheets

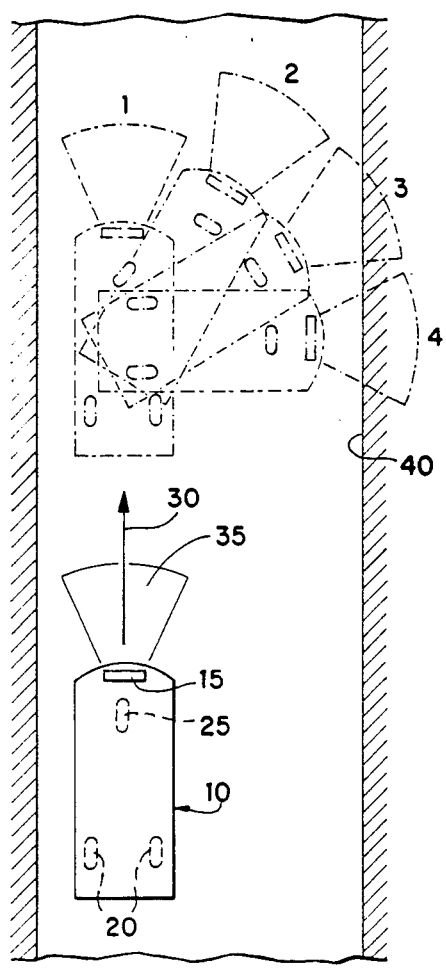
Fig. 1 (PRIOR ART)
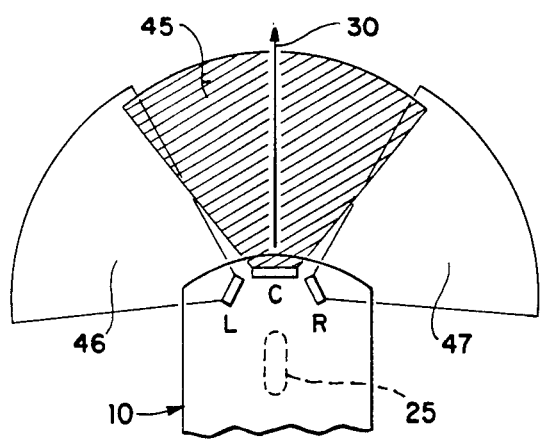
Fig. 2
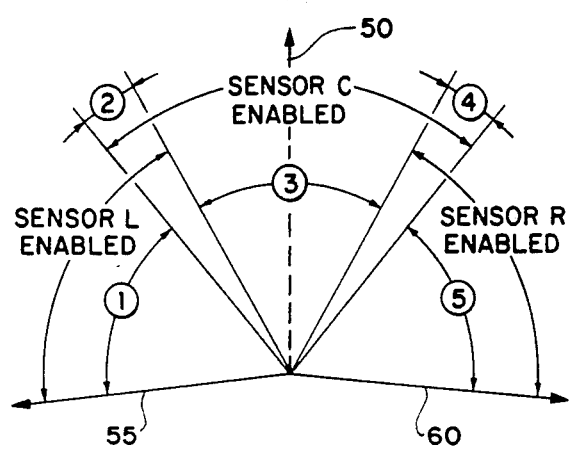
Fig. 3
Fig. 4
| ZONE | LEFT SENSOR L | CENTER SENSOR C | RIGHT SENSOR R | STEERING ANGLE |
|---|---|---|---|---|
| ① | ENABLE | DISABLE | DISABLE | L 40° to L 95° |
| ② | ENABLE | ENABLE | DISABLE | L 30° to L 40° |
| ③ | DISABLE | ENABLE | DISABLE | L 30° to R 30° |
| ④ | DISABLE | ENABLE | ENABLE | R 30° to R 40° |
| ⑤ | DISABLE | DISABLE | ENABLE | R 40° to R 95° |

D8

CONTROLLED DIRECTION NON-CONTACT DETECTION SYSTEM FOR AUTOMATIC GUIDED VEHICLES

BACKGROUND OF THE INVENTION

1. Field of the Invention

This invention relates to a control system for an automatically guided vehicle (AGV) and more specifically a non-contact collision avoidance system for an AGV for preventing collisions between the vehicle and obstacles in the path of the vehicle during various vehicle maneuvers, including relatively sharp turns.

2. Description of the Prior Art

Automatically guided unmanned vehicles are generally known in the art. Examples of such vehicles are disclosed in the following U.S. Pat. Nos. 4,328,545; 4,345,662; 3,379,497; 4,623,032; 4,602,334; 4,627,511; 3,039,554; 3,610,363; 3,933,099; 4,003,445; 4,151,526; 4,602,334 and 4,500,970.

Such automatically guided vehicles are used in a wide variety of applications, including the transfer of raw materials and subcomponent parts in manufacturing and assembly facilities, the cleaning of floors in warehouses and parking lots, and in the delivery of mail in offices. AGV's are also used in a wide variety of applications in the agricultural industry such as, plowing, harvesting, mowing and the like.

In each application, the AGV follows a preselected guide path. Various techniques are used for automatically guiding the vehicle along the preselected guide path. One such technique is disclosed in U.S. Pat. No. 3,039,554. In such a system, the guide path consists of a conductor either laid on the floor or embedded in the floor. An oscillatory signal applied to the conductor produces a magnetic field which is sensed by sensing coils located on the vehicle. Upon detection of the magnetic field, the sensing coils control the steering mechanism of the vehicle to guide the vehicle along the guide path. In U.S. Pat. No 4,003,445, the guide path consists of a fluorescent material, applied t a floor, carpet, or the like which emits visible light in a predetermined frequency range, but is normally invisible under ambient lighting conditions. In this type of guidance system, an ultraviolet light located on the vehicle irradiates the guide path. This radiation stimulates the fluorescent materials in the guide line to emit visible radiation for sensing by a sensor located on the vehicle for controlling the vehicle as it moves along the guide path.

Other systems for guiding an unmanned vehicle along a predetermined path are disclosed in U.S. Pat. Nos. 4,328,545; 4,345,662; 3,933,099; 4,379,497 and 4,500,970. These patents disclose various other optical, radio frequency and ultrasonic techniques for guiding an unmanned vehicle along a preselected guide path.

In addition to providing an automatic guidance system, it is also necessary to provide a collision avoidance system for an unmanned vehicle. Such a system is required to prevent the vehicle from colliding with various stationary and transient obstacles, such as pedestrians, in the path of the vehicle. Both tactile and non-contact collision avoidance systems for automatically guided vehicles are known in the art. For example, U.S. Pat. No. 4,328,545 discloses a tactile system wherein the vehicle is equipped with a front and rear bumper. In such a system, each bumper contains an interlock switch that stops the vehicle upon impact by either bumper with an obstacle.

Tactile sensors alone are unsuitable for applications where a possibility exists of a collision with a pedestrian. This is generally true of all automatically guided vehicles used in an office environment, such as automatically guided mail carts. In such applications, so-called non-contact collision avoidance systems are used. These systems utilize various ultrasonic, radar, infrared and radio frequency apparatus to detect obstacles in the path of the vehicle without contact. For example, U.S. Pat. No. 4,345,662 discloses a non-contact collision avoidance system consisting of a single ultrasonic transceiver mounted on the front of the vehicle for detecting obstacles along a forward path of travel of the vehicle.

An infrared collision avoidance system is disclosed in U.S. Pat. No. 4,627,511. In this type of system, an infrared emitter is affixed to various stationary obstacles along its guide path. Infrared sensors, located on the vehicle, detect the infrared radiation from the emitters affixed to the various obstacles. Once an obstacle is detected, the vehicle is stopped within a predetermined distance from the obstacle.

U.S. Pat. No. 3,039,554 discloses a collision avoidance system for an unmanned vehicle for preventing a collision between two or more automatically guided vehicles which operate along the same guide path. In this system, the guide path comprises an embedded conductor in the floor. The embedded conductor is divided into consecutive sections, each of which is normally deenergized. Once a vehicle is within a particular section of the guide path, control circuitry prevents other vehicles from entering the same section. While such a non-contact avoidance system may prevent collisions between a plurality of automatically guided vehicles along a common guide path, it would not be suitable for preventing collisions between the vehicle and an obstacle, such as a pedestrian, for obvious reasons.

In applications such as, for example, an automatically guided mail cart, it is desirable to provide a non-contact collision avoidance system for all types of obstacles that may be encountered by the vehicle, including pedestrians. Furthermore, in order to keep the cost of the system down, it is also desirable to provide the vehicle with a single collision avoidance system. In this type of application, radar, sonar or infrared detectors are normally used. Conventionally, one or more sensors are located on the front of the vehicle and mounted parallel to the longitudinal axis of the vehicle for detecting obstacles along the forward travel path of the vehicle. An example of such a system is disclosed in U.S. Pat. No. 4,345,662. In this system, the sensor looks ahead to detect obstacles in front of the vehicle. While such a system may be suitable for detecting obstacles in the path of the vehicle while the vehicle is being guided along a straight line path, the system may not perform satisfactorily when the vehicle is turning. During a turn, the sensor may not be "looking" in the same direction as the path of travel of the vehicle. The problem is clearly illustrated in stop action diagram form in FIG. 1. Referring to FIG. 1, the viewing angle of the obstacle sensor in four positions of the vehicle during a turn is shown. As will be noted, for a vehicle with a sensor mounted as shown in FIG. 1, the sensor will not be looking along the path of travel of the vehicle during the turn. As a matter of fact, in such an arrangement, the sensor may detect the wall in position 3 and unnecessarily stop the vehicle before the turn has been completed. Moreover, obstacles in the travel path during a turn may not be detected.

An example of a non-contact collision avoidance system for an automatically guided vehicle which is adapted to detect obstacles around a turn is disclosed in U.S. Pat. No. 4,151,526. In this prior art system, the vehicle is equipped with a radar apparatus for generating a signal which is received by a first antenna located along the guide path. The first antenna is connected via a transmission line to a second antenna also located along the guide path but spaced apart from the first antenna. The second antenna is located around the curve from the first antenna. In this system, electromagnetic waves, transmitted by the radar apparatus located on the vehicle, are received by the first antenna mounted along the guide path. These electromagnetic waves are transmitted from the first antenna to the second antenna by way of an interconnecting transmission line between the two antennas. The electromagnetic wave is then radiated from the second antenna toward the desired obstacle detection zone. If an obstacle is in the zone, the electromagnetic wave will be reflected off the obstacle and reflected back to the second antenna which, in turn, will transmit the electromagnetic wave to the first antenna by way of the interconnecting transmission line. The electromagnetic wave from the first antenna will be received by the radar apparatus located on board the vehicle to indicate the presence of an obstacle in the path of the vehicle around a curve in the guide path. However, even though such a system is able to detect obstacles in the path of the vehicle along a curve in the guide path, such a system requires that antennas be located along the guide path. Consequently, the system disclosed in U.S. Pat. No 4,151,526 would not be practical in certain applications, such as an office environment for automatically guided mail carts.

SUMMARY OF THE INVENTION

It is thus an object of the present invention to provide a non-contact collision avoidance system for an automatically guided vehicle that overcomes many of the problems of conventional collision avoidance systems.

It is also an object of the present invention to provide a collision avoidance system for an automatically guided vehicle to detect obstacles in the vehicle guide path while the vehicle is turning.

It is another object of the present invention to provide a collision avoidance system for an automatically guided vehicle which is suitable for use in an office environment, such as an automatically guided mail cart.

It is a further object of the invention to provide a collision avoidance system which is able to detect pedestrians.

It is still another object of the present invention to provide a collision avoidance system for an automatically guided vehicle wherein the number of spurious stops of the vehicle is reduced.

Briefly, the present invention relates to a non-contact collision avoidance system for an automatically guided vehicle adapted to be used in an environment, such as an office environment, as an automatically guided mail cart. The collision avoidance system in accordance with the present invention contains an obstacle sensing device that has a panoramic field of view mounted on the vehicle for sensing obstacles in the path of the vehicle during various vehicle maneuvers, including turns. The field of view of the sensor device is altered as a function of the steering angle of the vehicle. Thus, obstacles, such as pedestrians, can be detected even while the vehicle is turning without causing spurious stops of the vehicle even when the vehicle is making relatively sharp turns, such as, for example, 90° turns, in relatively close proximity to walls, file cabinets and the like. Once an obstacle is detected in the path of travel of the vehicle, appropriate means stop the vehicle to avoid a collision. In the preferred embodiment of the present invention, three vehicle-mounted sensors are contemplated. A center sensor is mounted along the longitudinal axis of the vehicle in the front of the vehicle for detecting obstacles in front of the vehicle within an obstacle detection zone which is symmetrical about the longitudinal axis of the vehicle. Left and right sensors are also provided and mounted on the vehicle and spaced apart from the center sensor for detecting obstacles along the path of travel of the vehicle during left and right turns, respectively. The center, left and right sensors are enabled as a function of the vehicle steering angle, which are divided into a plurality of zones, wherein each zone comprises a predetermined range of vehicle steering angles. While the vehicle is turning, one or more sensors is enabled as a function of the vehicle steering angle to detect obstacles which may, for example, be displaced 90° from the path of travel during a turn.

DESCRIPTION OF THE DRAWING

These and other objects and advantages of the present invention will become readily apparent upon consideration of the following detailed description and attached drawing, wherein:

FIG. 1 is a stop action diagram illustrating an automatically guided vehicle having a conventional collision avoidance sensor mounted in the front and along the longitudinal axis of the vehicle, and showing four positions of the vehicle during a 90° turn;

FIG. 2 is a partial plan view of the front portion of an automatically guided vehicle with an obstacle sensing device mounted thereon having a plurality of collision avoidance sensors in accordance with the present invention and illustrating the respective field of view for each sensor;

FIG. 3 is an exemplary steering angle diagram for an automatically guided vehicle having a steering angle range which varies, for example, from approximately a 95° left turn to approximately a 95° right turn, wherein the range of steering angles is divided into a plurality of zones defining which of the sensors are enabled;

FIG. 4 is a table which correlates the steering angles to the corresponding zones of FIG. 3;

DETAILED DESCRIPTION OF THE INVENTION

Figure 6:
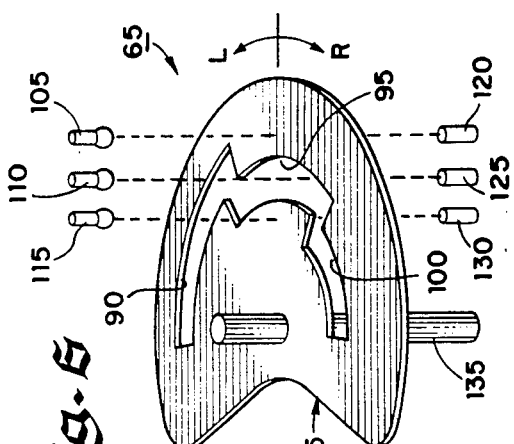
FIG. 6 is a perspective view of a steering angle sensor in accordance with the present invention.

While the non-contact collision avoidance system in accordance with the present invention will hereinafter be described in detail as a system for use in an unmanned vehicle, it will be appreciated by those in the art that the principles of the invention are not limited to such use. For example, the principles of the invention are also applicable to any vehicles that make sharp turns, including manned vehicles. All such applications are contemplated to be within the scope of the principles of the present invention.

Referring to FIG. 1, the bottom portion of the diagram illustrates a vehicle 10 having a conventional non-contact collision avoidance sensor 15 mounted in the front of the vehicle 10, symmetrically about the vehicle's longitudinal axis. The sensor 15 is adapted to detect obstacles along the forward travel path of the vehicle as indicated by the arrow 30 within a detection zone 35. The vehicle 10 is illustrated as a three-wheel vehicle having two fixed rear wheels 20 and a single front steerable wheel 25, which is normally guided along a surface having a predetermined guide path, such as an embedded conductor, fluorescent guide path and the like. However, it will be appreciated that the principles are also applicable to vehicles with other than three wheels and to a vehicle which travels along rails, such as a train.

The upper portion of FIG. 1 is a stop-action diagram of a vehicle 10, equipped with a conventional non-contact collision avoidance system, illustrating four positions of the vehicle during a relatively sharp right turn, for example, 90°. As should be apparent from the diagram, several problems may result while the vehicle 10 is turning. One problem is that the sensor may be unable to detect obstacles in the path of the vehicle during the turn because the obstacle detection zone 35 of the sensor 15 during the turn will not always coincide with the path of travel of the vehicle. Moreover, another problem may result when the vehicle is making a sharp turn in relatively close proximity to an obstacle, such as a wall 40. In this situation, the sensor 15 may detect the wall 40 prior to the completion of the turn and unnecessarily stop the vehicle 10, such as illustrated in FIG. 1 at position 3. One way to prevent the vehicle from stopping permanently in the position shown in position 3 is to provide a timer to restart the vehicle after a predetermined time interval, for example, one minute. However, even when the vehicle is equipped with a timer, it will stop again when it views another wall or another portion of the same wall. It is not uncommon for such a vehicle to stop three times when making a turn in a narrow hallway, thus blocking the hallway for about three minutes. As will be appreciated, the principles of the present invention are adapted to solve such problems.

FIG. 2 is a partial plan view of the front portion of a vehicle with collision avoidance sensors mounted thereupon in accordance with the principles of the present invention. Three sensors and their corresponding fields of view are shown. Although the present invention will be described in detail with three sensors, it is contemplated that several other embodiments will also be within the scope and breadth of the present invention. More or fewer sensors may be utilized depending upon the maximum steering angle of the vehicle and the particular sensor utilized. For example, a single sensor with a shutter or movable lens may be utilized. Moreover, the principles of the invention are not to be considered limited to any particular type of sensor. The principles of the present invention are applicable to various sensor systems known in the art, such as ultrasonic, radar, infrared and radio frequency systems.

Referring back to FIG. 2, in accordance with the present invention, three sensors, L, C, R, corresponding to left, center and right sensors, respectively, are illustrated, mounted in the front portion of the vehicle for detecting obstacles in the path of the vehicle during various vehicle maneuvers, including sharp turns. The corresponding field of view for each sensor is also shown. The aggregate field of view, as illustrated in FIG. 2, provided by the combination of all three sensors, provides panoramic sensing of obstacles which may be in the path of a vehicle during vehicle maneuvers including relatively sharp left and right turns, such as, for example, 90° or greater.

A center sensor C is mounted in the front of the vehicle, generally symmetrically about the longitudinal axis of the vehicle 10 for detecting obstacles in the forward travel path of the vehicle 10, as indicated by the arrow 30. The field of view for the center sensor C is illustrated in FIG. 2 by the cross-hatched detection zone 45. The left sensor L and the right sensor R are also located in the front of the vehicle 10, but mounted in a spaced relationship with the center sensor C for detecting obstacles while the vehicle is engaged in left and right turns, respectively. The left sensor L and the right sensor R are mounted symmetrically about the longitudinal axis of the vehicle to provide respective left turn and right turn fields of view 46 and 47, respectively, which are arcuately displaced from the field of view of the center sensor C.

As shown in FIG. 2, the fields of view for the sensors may overlap, however, it will be understood by those in the art that the principles of the invention are also applicable to multiple sensor embodiments where there is no overlap of the respective fields of view. For example, a sensor device with a shutter or movable lens may be utilized wherein the field of view of the sensor device is altered as a function of the vehicle steering angle. Moreover, the contour of the field of view illustrated in FIG. 2 is exemplary and may vary according to the type of sensor utilized (e.g., radar, ultrasonic, etc.), and it is not intended to limit the scope of the present invention in any way.

In one embodiment of the present invention, each of the respective sensors is only enabled for a preselected range of vehicle steering angles. These principles are best understood by reference to FIGS. 3 and 4. FIG. 3 is an exemplary steering angle diagram for a vehicle, such as an automatically-guided vehicle, having a steering angle range which varies, for example, from approximately a 95° left turn to a 95° right turn. As illustrated, the steering angle range is divided into five zones, identified in FIG. 3 by the encircled reference numerals 1 through 5. Although five zones are illustrated for the purpose of discussion, the number of zones into which the anticipated steering angle range is divided is in no way intended to limit the scope of the present invention. A dotted line 50 represents a steering angle datum of 0° (e.g., steering wheel positioned for vehicle travel along a straight line path). The angle between the datum 50 and the solid lines 55 and 60 indicates the maximum steering angle corresponding to a full left turn and a full right turn, respectively. In accordance with the present invention, FIG. 3 illustrates the zones for which the left sensor L, the center sensor C and the right sensor R is enabled. As noted, each sensor is enabled for one or more zones. For example, the left sensor L is enabled in zones 1 and 2. The center sensor C is enabled in zones 2 through 4, while the right sensor R is enabled in zones 4 and 5. The particular zones and corresonding steering angles for which each of the sensors is enabled is tabulated in FIG. 4. For example, the left sensor L is enabled for steering angles ranging from 30° to 95° to the left with respect to the datum 50. The center sensor C is enabled for steering angles in the range of 30° to the left to 30° to the right of the datum 50, while the right sensor is enabled for steering angles ranging from 30° to 95° to the right of the datum 50. By selectively enabling and disabling the sensors as illustrated in FIGS. 3 and 4, the vehicle is able to detect obstacles in its path even while the vehicle is engaged in a turn while minimizing nuisance detection of obstacles such as when the vehicle is engaged in a relatively sharp turn relatively close to an obstacle, such as a wall as heretofore discussed in conjunction with FIG. 1. In an alternate embodiment, a sensor device with a shutter or movable lens can be utilized wherein the field of view of the sensor device is altered as a function of the vehicle steering angle.

Figure 5:
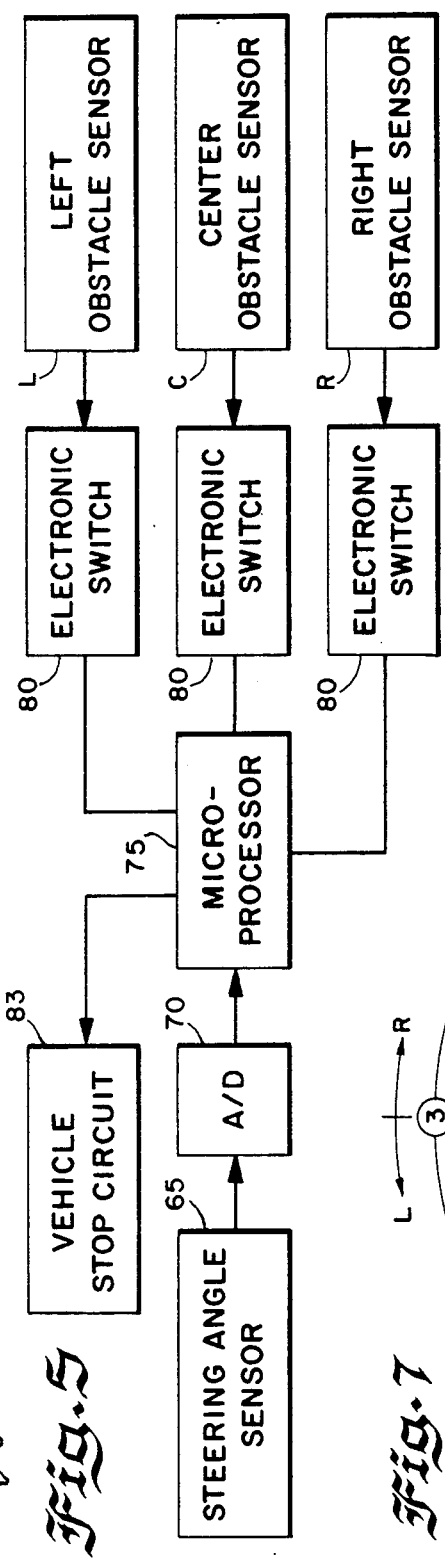
FIG. 5 is a block diagram of the collision avoidance system in accordance with the present invention.

A collision avoidance system embodying the principles of the present invention is illustrated in FIG. 5. The system is illustrated in block diagram form and is capable of implementation in various ways, all of which are contemplated by the present invention. For example, rather than utilizing a microprocessor, various arrangements and combinations of analog and digital components may be utilized. However, since many automatically guided vehicles may already have an on-board microprocessor used for purposes other than collision avoidance, the implementation utilizing a microprocessor may be preferable.

A steering angle signal is obtained from a steering angle sensor 65, which will be described hereinafter in detail. Steering angle sensors with both an analog and digital output signal are contemplated If the particular steering angle sensor 65 utilized provides an analog output signal, the signal will have to be applied to an analog-to-digital (A/D) converter 70. The output signal from the A/D converter 70 is, in turn, applied to a microprocessor 75. On the other hand, if the steering angle sensor 65 utilized provides a digital output signal, the A/D converter 70, of course, can be eliminated. The output signal from steering angle sensor 65 is applied to the microprocessor 75 on a continuous basis. Responsive to the steering angle sensor signal, the microprocessor 75 determines the zone corresponding to the steering angle of the vehicle at a given time, for example, as shown in FIGS. 3 and 4. Once the zone corresponding to the steering angle is determined, the microprocessor 75 will enable the respective sensors as a function of the zone corresponding to the vehicle steering angle. One way of enabling the obstacle sensors is to utilize electronic switches, such as the electronic switches 80 illustrated in FIG. 5, to selectively control the data flow from each of the obstacle sensors to the microprocessor 75. Signals from the various obstacle sensors are applied to the microprocessor 75 via the electronic switches 80. The electronic switches 80 are enabled as a function of the vehicle steering angle, such as, for example, as shown in FIG. 3 and FIG. 4. Upon detection of an obstacle, the microprocessor 75 provides a signal to the vehicle stop circuit, illustrated by the block 83, to stop the vehicle. In an alternate embodiment, rather than control the data flow from the obstacle sensors to the microprocessor 75, the sources of electrical power to each sensor can be placed under the control of the microprocessor 75. Various controls for stopping vehicles are well known in the art and do not comprise part of the present invention. Furthermore, control of the microprocessor 75 to perform the functions herein described is well within the ordinary skill in the art. The system heretofore illustrated thus provides a non-contact collision avoidance system with a obstacle detector device wherein the field of view is selectively altered as a function of the steering angle of the vehicle.

Figure 7:
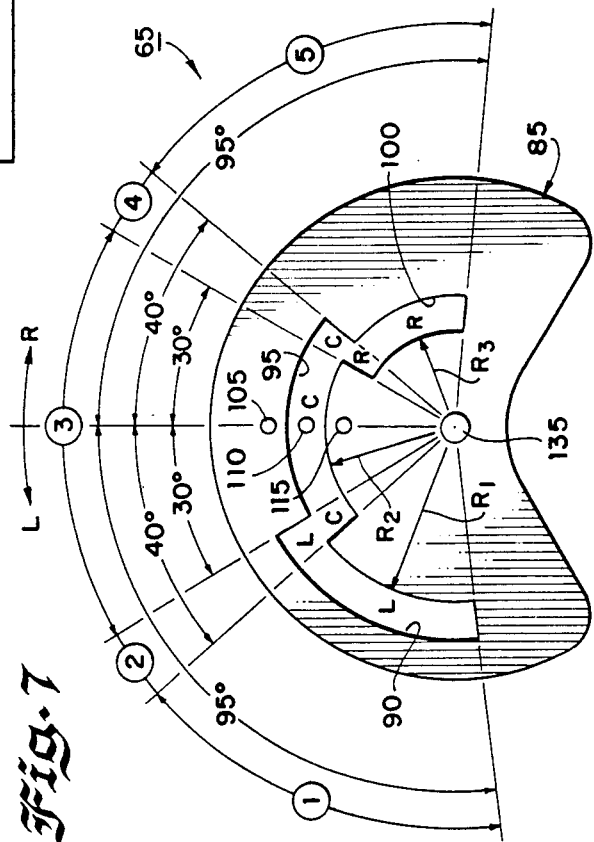
FIG. 7 is a plan view of the steering angle sensor illustrated in FIG. 6.

FIG. 6 and FIG. 7 illustrate another important aspect of the present invention, namely, a steering angle sensor 65 for providing a signal representative of the vehicle steering angle. The steering angle sensor 65 comprises an optical shutter arrangement comprising a shutter disc 85 having a plurality of arcuate slots 90, 95 and 100, light sources 105, 110 and 115 and light detectors 120, 125 and 130. The shutter disc 85 is mounted in a fixed relationship with the vehicle steering mechanism, and pivots about an axis 135, so that the shutter disc 85 turns with the vehicle steering mechanism to provide a signal representing the vehicle steering angle. The light sources 105, 110 and 115 are fixed and aligned with light detectors 120, 125 and 130, respectively. Each of the arcuate slots 90, 95 and 100 in the shutter disc 85 corresponds to a predetermined range of vehicle steering angles and corresponding zones for which the respective obstacle sensors are enabled, for example, as shown in the table in FIG. 4. Each of the arcuate slots 90, 95 and 100 is displaced from the axis 135 about which the shutter disc 85 rotates by a different radius. For example, the slot 90 is displaced from the pivot 135 by a radius $R_1$ while the arcuate slots 95 and 100 are displaced from the axis 135 by the radii $R_2$ and $R_3$, respectively. In operation, when the steering angle of the vehicle is within the range identified in FIG. 4 corresponding to zones 1 and 2, the arcuate slot 90 will be positioned between the light source 105 and the detector 120, thus providing a continuous light path therebetween indicating that the vehicle is engaged in a left turn with a vehicle steering angle between 40° and 95°. Similarly, when the slot 95 is positioned between the light source 110 and the light detector 125, the sensor 65 will indicate that the vehicle steering angle is within the range identified as corresponding to zones 2, 3 and 4. Vehicle steering angles within the zones 1 and 2 are detected in a similar manner when the arcuate slot 100 is positioned between the light source 115 and the light detector 130. When the vehicle steering angle is within zone 2, the overlapping portion of the arcuate slots 90 and 95 will be positioned between the light sources 105 and 110 and the light sensors 120 and 125, respectively, for providing a continuous light path between the light source 105 and light sensor 120 and between the light source 110 and the light sensor 125. When two continuous light paths between the aforementioned light source and light sensor combinations are detected, the sensor indicates the steering angle of the vehicle is within zone 2. Similarly, when two continuous light paths are detected between the light source 110 and light sensor 125 and light source 115 and light sensor 130, the sensor indicates the steering angle of the vehicle is within zone 4.

Thus, it should be apparent that a unique collision avoidance system, including a vehicle steering angle sensor, has been disclosed for detecting obstacles in the path of the vehicle even while the vehicle is engaged in a relatively sharp turn. As heretofore discussed, the system can be implemented in a number of ways, all of which are contemplated to be within the scope of the appended claims.

What is claimed and desired to be secured by Letters Patent of the United States is:

1. A non-contact collision avoidance system for a vehicle for preventing collisions between the vehicle and obstacles in the path of the vehicle comprising:

means for providing a signal representative of a predetermined range of steering of the vehicle;
means having a predetermined field of view adapted to be mounted on the vehicle for sensing obstacles in the path of the vehicle;
means for selectively altering the field of view of the obstacle sensor means as a function of the steering angle of the vehicle; and
means for automatically stopping the vehicle upon detection of an obstacle in the path of the vehicle.

2. A non-contact collision avoidance system as recited in claim 1, wherein predetermined ranges of said steering angles comprise a plurality of zones.

3. A non-contact collision avoidance system as recited in claim 1, wherein the obstacle sensing means comprises a plurality of sensors.

4. A non-contact collision avoidance system as recited in claim 1, wherein the obstacle sensing means comprises a radar sensor.

5. A non-contact collision avoidance system as recited in claim 1, wherein the obstacle sensing means comprises an ultrasonic sensor.

6. A non-contact collision avoidance system as recited in claim 1, wherein the obstacle sensing means comprises a radio frequency sensor.

7. A non-contact collision avoidance system as recited in claim 1, wherein the obstacle sensing means comprises an infrared sensor.

8. A non-contact collision avoidance system as recited in claim 1, wherein the obstacle sensing means is mounted on the vehicle for detecting obstacles within a range of vehicle steering angles from approximately 95° left to approximately 95° right from straight line travel.

9. A non-contact collision avoidance system for a vehicle for preventing collisions between the vehicle and obstacles in the path of the vehicle comprising:
means for providing a signal representative of the steering angle of the vehicle;
means mounted on the vehicle having a predetermined field of view for sensing obstacles in the path of forward travel of the vehicle;
means mounted on the vehicle having a predetermined field of view for sensing obstacles in the path of the vehicle during a left turn of the vehicle;
means mounted on the vehicle having a predetermined field of view for sensing obstacles in the path of the vehicle during a right turn of the vehicle;
means for enabling one or more of the sensing means as a function of the steering angle of the vehicle; and
means for stopping the vehicle upon detection of an obstacle in the path of the vehicle.

10. A non-contact collision avoidance system as recited in claim 9, wherein the fields of view of the forward travel obstacle sensing means, the left turn obstacle sensing means and the right turn obstacle sensing means are not substantially equal.

11. A non-contact collision avoidance system as recited in claim 10, wherein the field of view of the left turn obstacle sensing means is substantially equivalent to the field of view of the right turn obstacle sensing means.

12. A non-contact collision avoidance system as recited in claim 9, wherein the forward travel obstacle sensing means, the left turn obstacle sensing means and the right turn obstacle sensing means are mounted on the vehicle such that the fields of view of two or more of said obstacle sensing means at least partially overlap each other.

13. A non-contact collision avoidance system as recited in claim 12, wherein the field of view of the left turn obstacle sensing means partially overlaps the field of view of the forward travel obstacle sensing means.

14. A non-contact collision avoidance system as recited in claim 12, wherein the field of view of the right turn obstacle sensing means partially overlaps the field of view of the forward travel obstacle sensing means.

15. A non-contact collision avoidance system as recited in claim 12, wherein the overlapping portion of the fields of view of the obstacle sensing means represents a predetermined range of vehicle steering angles.

16. A non-contact collision avoidance system as recited in claim 15, wherein said predetermined range of vehicle steering angles represents a steering angle zone.

17. A non-contact collision avoidance system as recited in claim 9, wherein the steering angle providing means includes optical means for providing a signal representative of the vehicle steering angle.

18. A non-contact collision avoidance system as recited in claim 17, wherein said optical means comprises:
means for selectively interrupting one or more light paths including a shutter disc having a plurality of arcuate apertures;
means mounted in a fixed relationship with respect to the shutter disc for providing a light source; and
means for detecting light from said light source providing means when one or more arcuate apertures is positioned between said light source providing means and said light detecting means.

19. A non-contact collision avoidance system as recited in claim 18, wherein the shutter disc is mounted on the vehicle steering apparatus to provide a signal representative of the vehicle steering angle.

20. A non-contact collision avoidance system for a vehicle for preventing collisions between the vehicle and obstacles in the path of the vehicle comprising:
means for providing a signal representative of the steering angle of the vehicle;
means mounted on the vehicle having a field of view for sensing obstacles in the path of forward travel of the vehicle;
means mounted on the vehicle for sensing obstacles in the path of the vehicle during a left turn of the vehicle;
means mounted on the vehicle having a field of view for sensing obstacles in the path of the vehicle during a right turn of the vehicle;
means for disabling one or more of the obstacle sensing means as a function of the steering angle of the vehicle; and
means for stopping the vehicle upon detection of an obstacle in the path of the vehicle.

21. A non-contact collision avoidance system as recited in claim 20, wherein the fields of view of the forward travel obstacle sensing means, the left turn obstacle sensing means and the right turn obstacle sensing means are not substantially equal.

22. A non-contact collision avoidance system as recited in claim 20, wherein the field of view of the left turn obstacle sensing means is substantially equivalent to the field of view of the right turn obstacle sensing means.

23. A non-contact collision avoidance system as recited in claim 20, wherein the forward travel obstacle sensing means, the left turn obstacle sensing means and the right turn obstacle sensing means are mounted on the vehicle such that the fields of view of two or more of said obstacle sensing means at least partially overlap each other.

24. A non-contact collision avoidance system as recited in claim 20, wherein the field of view of the left turn obstacle sensing means partially overlaps the field of view of the forward travel obstacle sensing means.

25. A non-contact collision avoidance system as recited in claim 20, wherein the field of view of the right turn obstacle sensing means partially overlaps the field of view of the forward travel obstacle sensing means.

26. A non-contact collision avoidance system as recited in claim 20, wherein the overlapping portion of the fields of view of the obstacle sensing means represents a predetermined range of vehicle steering angles.

27. A non-contact collision avoidance system as recited in claim 26, wherein said predetermined range of vehicle steering angles represents a steering angle zone.

28. A non-contact collision avoidance system as recited in claim 20, wherein the steering angle providing means includes optical means for providing a signal representative of the vehicle steering angle.

29. A non-contact collision avoidance system as recited in claim 28, wherein said optical means comprises:
   means for selectively interrupting one or more light paths including a shutter disc having a plurality of arcuate apertures;
   means mounted in a fixed relationship with respect to the shutter disc for providing a light source; and
   means for detecting light from said light source providing means when one or more arcuate apertures is positioned between said light source providing means and said light detecting means.

30. A non-contact collision avoidance system as recited in claim 29, wherein the shutter disc is mounted on the steering apparatus to provide a signal representative of the vehicle steering angle.

* * * * *